US 9,753,805 B2

(12) United States Patent
Grammel et al.

(10) Patent No.: US 9,753,805 B2
(45) Date of Patent: Sep. 5, 2017

(54) METHOD AND APPARATUS FOR RESTORING A CONNECTION THROUGH A PROVIDER NETWORK UPON REQUEST

(75) Inventors: Gert Grammel, Ditzingen (DE); Lieven Levrau, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 413 days.

(21) Appl. No.: 13/814,414

(22) PCT Filed: Aug. 3, 2011

(86) PCT No.: PCT/EP2011/063375
§ 371 (c)(1),
(2), (4) Date: Feb. 5, 2013

(87) PCT Pub. No.: WO2012/028409
PCT Pub. Date: Mar. 8, 2012

(65) Prior Publication Data
US 2013/0173953 A1 Jul. 4, 2013

(30) Foreign Application Priority Data
Sep. 1, 2010 (EP) .................................. 10305938

(51) Int. Cl.
*G06F 11/14* (2006.01)
*H04L 12/24* (2006.01)
*H04L 12/26* (2006.01)

(52) U.S. Cl.
CPC ...... *G06F 11/1415* (2013.01); *H04L 41/0668* (2013.01); *H04L 43/0811* (2013.01)

(58) Field of Classification Search
CPC ......... H04L 45/28; H04L 45/22; H04L 45/00; H04L 45/02
(Continued)

(56) References Cited

U.S. PATENT DOCUMENTS

| 5,435,003 A | 7/1995 | Chng et al. |
| 2003/0128661 A1* | 7/2003 | Weis ............................ 370/216 |

(Continued)

FOREIGN PATENT DOCUMENTS

| JP | 2004153760 | 5/2004 |
| JP | 2007088865 | 4/2007 |
| WO | 97/50211 | 12/1997 |

OTHER PUBLICATIONS

Farrel, A. et al; Inter-Domain MPLS and GMPLS Traffic Engineering—Resource Reservation Protocol—Traffic Engineering (RSVP-TE) Extensions; Network Working Group; IETF RFC 5151; Updates 3209, 3473; Standards Track; Feb. 2008; 25 pages.

(Continued)

Primary Examiner — Jigar Patel
(74) Attorney, Agent, or Firm — Patti & Malvone Law Group, LLC

(57) ABSTRACT

A method and related apparatus are provided for restoring a connection through a provider network (PN). In particular, a connection is established along a path (P1) through the provider network (PN) for the transport of client traffic between two client network nodes (CR1, CR2) of a client network (CD1, CD2). Any restoration service for this connection is deactivated. However, when a failure (F1) is detected along the path (P1) which affects the connection, a path search is performed anyhow to determine a projected restoration path (P2) through the provider network (PN) available to restore said failed connection. In the case that the path search was successful and a projected restoration path (P2) was found, the availability of the projected restoration path (P2) is communicated (MS1, MS2) to the client network (CD1, CD2). The client can now decide whether to accept a temporary service upgrade to restoration service or not. Only after receipt of a confirmation (CM1, CM2) from
(Continued)

said client network (CD1, CD2), a path restoration is performed to restore the failed connection over the projected restoration path (P2).

8 Claims, 2 Drawing Sheets

(58) Field of Classification Search
USPC .......................................................... 714/4.3
See application file for complete search history.

(56) References Cited

U.S. PATENT DOCUMENTS

| 2007/0058528 | A1* | 3/2007 | Massa et al. ................. | 370/218 |
| 2010/0091647 | A1* | 4/2010 | Li et al. ........................ | 370/225 |
| 2012/0051212 | A1* | 3/2012 | Xu et al. ....................... | 370/223 |

OTHER PUBLICATIONS

Lang, J.; Link Management Protocol (LMP); Network Working Group; IETF RFC 4204; Standards Track; Oct. 2005; 86 pages.
Katz, D. et al; Traffic Engineering (TE) Extensions to OSPF Version 2; Network Working Group; IETF RFC 3630; Standards Track; Sep. 2003; 14 pages.

* cited by examiner

METHOD AND APPARATUS FOR RESTORING A CONNECTION THROUGH A PROVIDER NETWORK UPON REQUEST

FIELD OF THE INVENTION

The present invention relates to the field of telecommunications and more particularly to a method and related apparatus for restoring a connection through a provider network upon request from a client.

BACKGROUND OF THE INVENTION

In current provider networks, a connection can be established and provided to a client. The client can use this connection in his client network and transmit data traffic over the connection. An important aspect is resilience. Several options exist to react on a network failure in the provider network which affects the connection.

A first option is what is known as protection. This means that in advance of any failure, a second redundant connection is established in the provider network between the provider edge nodes, which can then autonomously switch over in the case of a failure from the failed connection to the redundant connection. This will typically occur in less than 50 ms. Protection, however, is an expensive premium service that reserves bandwidth, which will be unused during normal operation, and that has to be booked by the client at an extra charge.

Another possibility is known as network restoration. After occurrence of a failure, a restoration path is determined in the provider network and the failed connection is then re-established over the restoration path. This network restoration can happen automatically through the network management system of the provider or, in case of an automatically switched (optical) network, through a distributed control plane of the provider network. Network restoration takes typically longer than protection to recover the traffic from the failure. The network restoration capability is also a feature that has to be booked by the client in advance, which is typically done in a service level agreement (SLA) between the provider and the client. Restoration mechanisms are known for example from US5435003 and WO97/50211.

A third alternative would be that the client himself provides in his client network sufficient spare capacity, which allows him to recover from a failure without involving the network provider by rerouting the failed traffic over his own spare resources. This alternative may be advantageous for large client networks, since it may save fees charged by the provider for protection or restoration services.

Finally, a fourth variant would be that the client requests from the network provider as a reaction to a failure a new connection and reroutes in his client network traffic from the failed connection over the new connection once established to recover from the failure. In this bandwidth on demand scenario, however, source and sink of the new connection cannot be planned in advance and therefore, the network provider is not able to efficiently plan his network. Moreover, after repair of the failure, the network provider is not able to modify automatically the on-demand connection to revert to the situation before the failure.

SUMMARY OF THE INVENTION

It is therefore an object of the present invention to provide an improved method and related apparatus for recovering a connection through a provider network in the case of a failure.

These and other objects that appear below are achieved by a method and related apparatus for restoring a connection through a provider network. In particular, a connection is provided along a path through the provider network between two provider edge nodes for the transport of client traffic between two client network nodes of a client network. The connection is terminated at network side interfaces of the provider edge nodes. The client traffic is received at customer side interfaces of the provider edge nodes. Switched interconnections are configured within the provider edge nodes between the respective customer side interfaces and network side interfaces. Any restoration service for this connection is deactivated. However, when a failure is detected along the path which affects the connection and a failure notification is received at at least one of the network side interfaces of the provider edge nodes, a path search is performed anyhow to determine a projected restoration path through the provider network available to restore said failed connection. In the case that the path search was successful and a projected restoration path was found, the availability of the projected restoration path is communicated over at least one of the customer side interfaces to the client network. The client can now decide whether to accept a temporary service upgrade to restoration service or not. Only after receipt of a confirmation from said client network at one of the customer side interfaces, a path restoration is performed to restore the failed connection over said projected restoration path.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
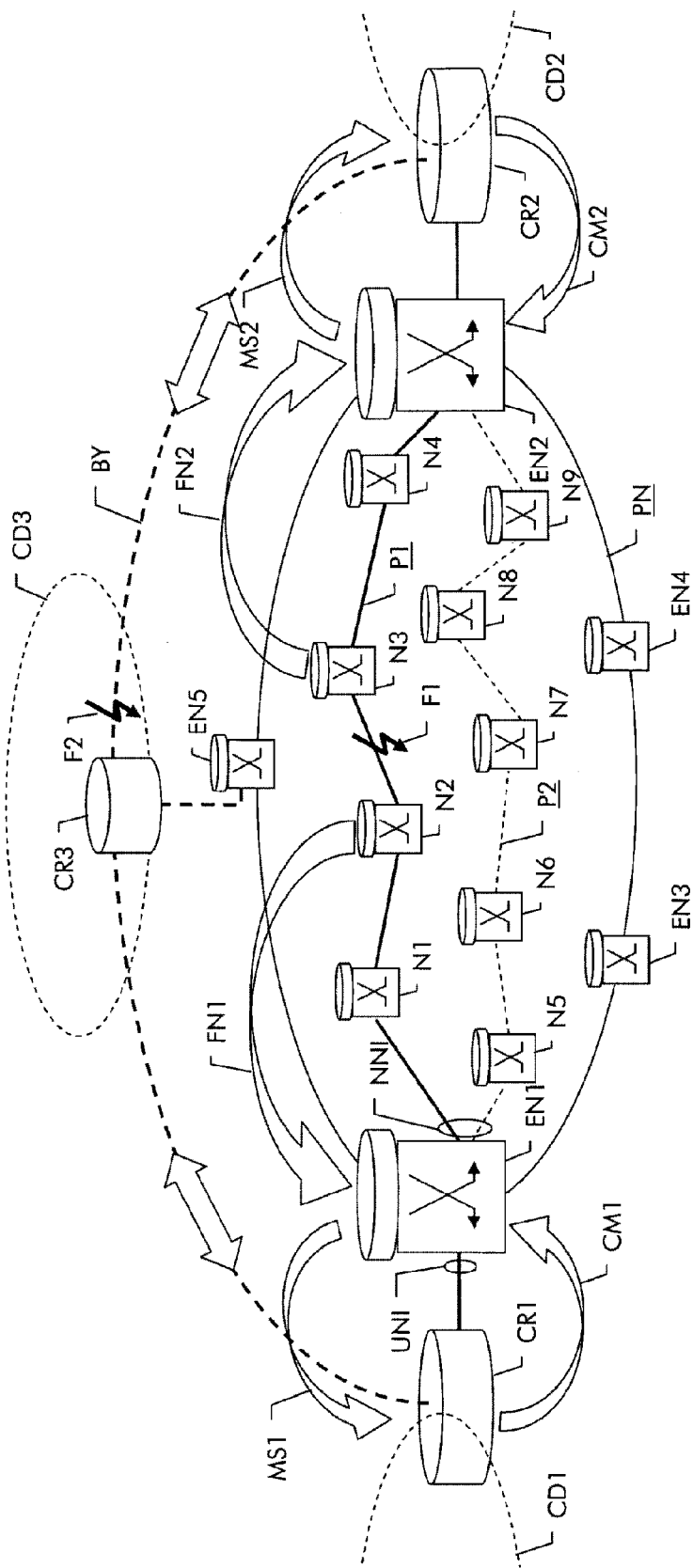
FIG. 1 shows a provider network and several client network domains connected thereto.

FIG. 1 shows an example network topology, with a provider network PN and a number of client network domains CD1, CD2, CD3. Provider network PN contains a number of network nodes N1-N9 and provider edge nodes EN1-EN5. It is assumed that these nodes are interconnected through a mesh of physical links, which are not shown for the sake of lucidity.

Client network domains CD1, CD2, CD3 are for instance packet switched network domains and the provider network PN is an optical network in accordance with the SDH or OTN standards.

Provider network PN has a distributed control plane based on the GMPLS protocol suite. Each network node has an associated control plane element. The control plane elements communicate among each other to exchange topology information, populate their traffic engineering databases with routing data, determine paths in the network to establish new connections, and exchange signaling messages to actually set up such new connections. A provider network with distributed control plane is sometimes also referred to as automatically switched optical network (ASON).

The interface between a provider edge node EN1 and a client network device CR1 is referred to as a user network interface UNI and the interface between provider edge node EN1 and other provider network nodes is referred to as network node interface NNI. An example for a UNI would be a client interface conforming to the Ethernet or Ethernet/MPLS standards and an example for the NNI would be an interface in accordance with the SDH or OTN standards.

A data connection along path P1 through provider network PN interconnects a client router CR1 in client network domain CD1 and a client router CR2 in client network domain CD2. In particular, client router CR1 is connected to a first edge node EN of the provider network PN and client router CR2 is connected to a second edge node EN2 of the provider network PN. The network connection interconnecting client routers CR1 and CR2 is established along path P1 between edge nodes EN1 and EN2 leading over network nodes N1, N2, N3, and N4.

It is now assumed that a failure F1 like a fiber break interrupts the physical link between nodes N2 and N3. However, a failure can likewise affect a network node along path P1. As a consequence, the data connection along path P1 is interrupted and client routers CR1 and CR2 cannot interchange data anymore over this connection.

In order to protect against such a failure in the provider network PN, the client can agree in a service level agreement with the provider a certain availability of the service and whether or not the connection will either be permanently protected (recovery time <50 ms) or in the case of a failure automatically restored (recovery time >100 ms up to few seconds).

When restoration service is activated for path P1, in the case of a failure an alternate path such as path P2 can be determined, which in this example leads over network nodes N5, N6, N7, N8, and N9, and the failed connection can be automatically reestablished over this alternate path P2. Such restoration service needs to be booked at the same time when the network connection is booked, since the network provider needs be able to dimension his network and plan sufficient spare resources in order to be able to fulfill his obligations under the SLA.

On the other hand, the client may decide not to book a restoration service but to provide own spare resources in his client network. He may hence have designed his client network such that the failure of a single connection can be compensated for by rerouting data traffic from the failed connection over other resources of his client network.

In the present embodiment, it is shown schematically in FIG. 1 that a bypass path BY exists between client network domains CD1 and CD2, which leads over client network domain CD3. Hence, data traffic between client routers CR1 and CR2 can be rerouted over bypass path BY of the client network, so that no urgency exists for the client to have the failed connection along path P1 restored. It could hence save the client costs if he books a cheaper service from the network provider, for which along path P1 the automatic restoration mechanism of the provider network PN is not available.

It should be understood that the bypass connection BY itself can be a connection provided through provider network PN to interconnect network domains CD1, CD2, and CD3, respectively. The network provider, however, will not know about the topology of the client network and the potential use of these interconnections as bypass path for path P1.

As shown in FIG. 1, however, a second failure F2 may affect bypass path BY in client network domain CD3 (or anywhere else along the bypass path BY). In this case, rerouting of data traffic from failed connection P1 would not be possible anymore and if no restoration service has been booked for the connection along path P1, the failure could not be recovered. Even if there were currently sufficient idle resources available in the provider network PN, no restoration function for the failed path P1 could be activated since the network provider does not know of the second failure F2 affecting the client's network or at least does not know about the client's network topology and the potential impact of any other failure on the survivability of the client network. The inventors have hence thought of a mechanism and protocol to improve this situation.

According to an embodiment, a search for a restoration path is performed in the case of a failure F1 affecting path P1, even though the restoration service is deactivated for path P1. If a restoration path P2 can be found, an offer is made to the client network device over the UNI to activate the restoration service and restore the failed path. The responsible device in the client network can either accept and approve the offer, or reject it, depending on whether a restoration would currently be advisable from the point of view of the client network or not. Network nodes along projected restoration path P2 can additionally perform a pre-signaling of path set-up messages for the restoration path to temporarily reserve the resources and speed up an actual path set-up in case the client network approves the offer.

Message flow between the affected network elements is shown in FIG. 1 as twisted block arrows. The failure F1 is detected by the adjacent network nodes N2 and N3, respectively. Network node N2 sends a failure notification FN1 to edge node EN1 and node N3 sends a failure notification FN2 to edge node EN2. Even though restoration service is not activated for the failed path P1, edge nodes EN1 and (/or) EN2 start a computational path search for a restoration path. Since in this embodiment sufficient idle capacity is available in provider network PN, a restoration path P2 can be determined, over which the failed connection could be reestablished to recover the client traffic. However, edge nodes EN1 and EN2 do not initiate a connection set-up along the projected restoration path P2, but send messages MS1, MS2 to the client routers CR1, CR2, respectively. Messages MS1, MS2 contain the information that a restoration path would be available and that the failed connection could be restored. The client routers CR1, CR2 can then send a confirmation message CM1, CM2 which request from the edge nodes EN1, EN2 to restore the failed connection over restoration path P2.

This has several advantages: The provider can offer to the customer resources that are currently idle in his network and can hence improve the efficiency of resource usage in his network and earn additional charges for these. On the other hand, he is not bound through an SLA to provide sufficient restoration resources in his network to enable restoration under all circumstances. In the event that no free resources for a restoration path P2 can be found, he is not obliged to offer the restoration service as a service upgrade to the client, but he can if sufficient resources exist. For the client, it is advantageous, that he may book the more cost efficient connection without restoration service, while in the less likely event of a double failure or an overload situation on his bypass path BY, he would still have a good chance to restore the traffic from failed path P1 by accepting a temporary service upgrade at an extra charge. Hence, extra charges become due for him only in the event of a failure he cannot compensate through his own means. For both of them, this leads to an improved resources utilization at a reduced risk. Moreover, no additional equipment is needed for the provider to implement this service upgrade, since the control plane resources that perform the path calculation and set-up of restoration paths are available anyhow, even though not activated for the current path P1.

In an advantageous improvement, edge nodes EN1, EN2 can prepare a possible restoration action by signaling to the intermediate nodes N5, N6, N7, N8, and N9 the details about the projected connection along path P2. The eventual set-up of the restoration connection is then performed upon confirmation from any of the client routers CR1, CR2 by sending to intermediate nodes N5, N6, N7, N8, and N9 an activation message to activate the pre-signaled restoration connection. This would speed up restoration and would allow to temporarily reserve resources along path P2. If the offer to restore the failed connection is rejected or is not confirmed within a predefined amount of time, temporarily reserved resources along path P2 will be released again.

In a further improvement, in the case no idle resources can be found to set up a restoration path, path calculation can consider also busy network resources, which are used by low priority traffic. Such low priority traffic could be dropped to free resources to establish a restoration path for higher priority traffic (preemption). If a restoration path can be found, which requires to drop low priority traffic, the messages MS1, MS2 would contain an indication that the priority level of the traffic from the failed path P1 could be temporarily increased and the confirmation message CM1, CM2 would contain the approval to temporarily increase the priority level and consequently the acceptance of additional charges.

Figure 2:
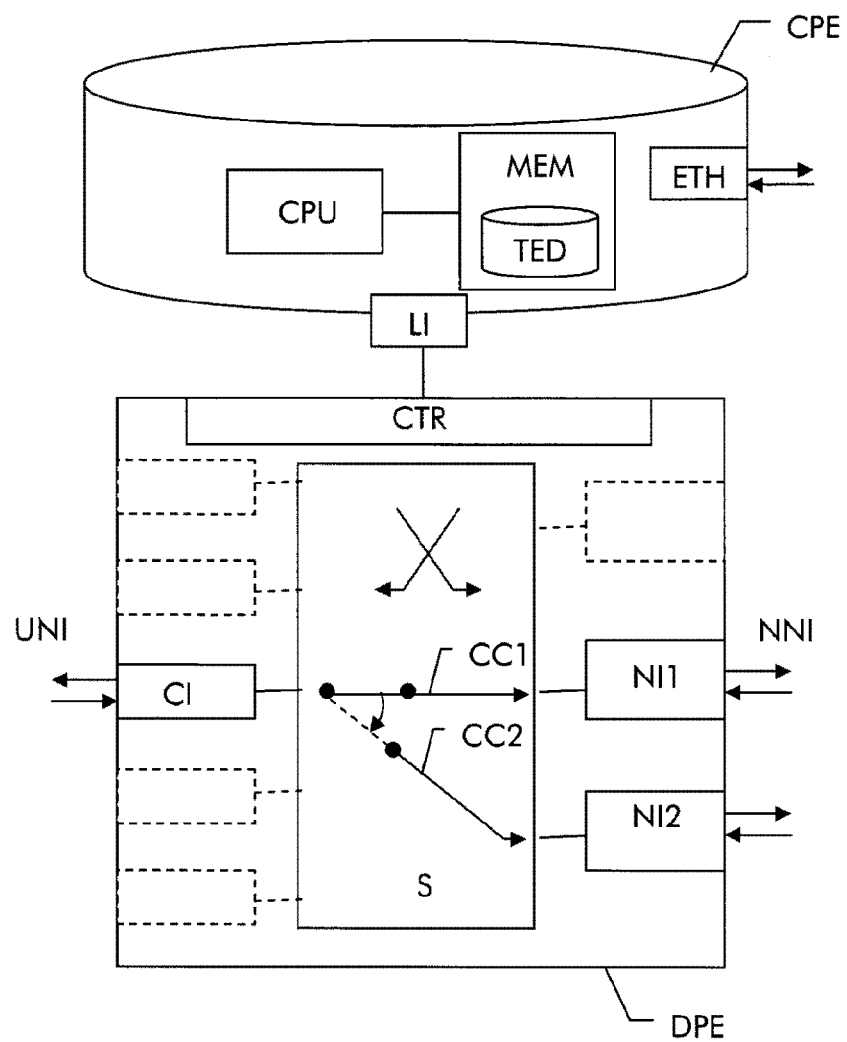
FIG. 2 shows a block diagram of a network node of the provider network.

FIG. 2 shows a block diagram of a network node N for use as provider edge node EN1, EN2 in FIG. 1. Network node N contains a data plane element DPE and a control plane element CPE.

Data plane element DPE contains at least two network side interface NI1, NI2, at least one customer side interface CI, a switch matrix S controllably interconnecting interfaces NI1, NI2, CI, and a local controller CTR. Among others, controller CTR monitors interfaces NI1, NI2, CI and switch matrix S as well as any other hardware and software components of the data plane element DPE for malfunctions, configures these in accordance with received configuration requests, and forwards alarms in case of malfunction.

It should be understood that a network node may have many further customer side and network side interfaces, as indicated with broken lines, which are likewise controllably interconnected through switch matrix S. Network side interfaces represent the network node interface NNI and user side interfaces represent the user network interface UNI of the network node N.

Control plane element CPE contains a processor CPU and a memory MEM, which stores among others a traffic engineering database TED and a software-implemented path computation algorithm. Control plane element CPE further contains interface means for communication with control plane elements of other network nodes in the provider network. As will be apparent to those skilled in the art, such interface means could include a dedicated Ethernet interface ETH, but could also include a local interface LI connected with controller CTR of the data plane element DPE for communication of control plane traffic over one or more dedicated control channels in the overhead of transport signals sent on the network node interface NNI, or as control messages such as EthernetOAM frames sent on the user network interface UNI. The control plane element CPE communicates via local interface LI with local controller CTR of data plane element DPE to configure the interfaces CI, NI1, NI2 and the switch matrix S of the data plane element DPE.

Control plane elements throughout the provider network communicate using the IP-based GMPLS protocol suite (including RSVP-TE, LMP, and OSPF-TE protocols) to exchange link state information, report failure notifications, exchange topology data to populate their traffic engineering databases and establish connections in the provider network. Traffic engineering database TED contains topology and link state information about the provider network, which allows to determine paths for connections to be established using for instance a least cost algorithm such as OSPF. Such control plane elements and data plane elements are well known per se in the art.

It is now assumed that network node N acts as provider edge node EN1 in the network scenario of FIG. 1. Network side interface NI1 is linked to provider node N1 and traffic signals received on client side interface CI are switched through switch matrix S to network side interface NI1, so that these are transported as payload over the connection established through the provider network along path P1. An internal cross-connection CC1 is therefore configured through switch matrix S.

Control plane element CPE, which task it would actually be to initiate restoration actions in the case of failures affecting any connection that is terminated by network node N, is configured to deactivate restoration service for the connection along path P1.

In the scenario of FIG. 1, control plane element CPE receives failure notification FN1 informing of the failure F1 that affects path P1. A further failure notification (not shown) may be sent over the UNI to client router CR1. Even though restoration service is deactivated for path P1, control plane element CPE performs a path search to determine a restoration path and finds path P2 as projected restoration path. Responsive to finding the projected restoration path P2, control plane element CPE sends a massage MS1 over the client side interface CI to client router CR1. This message can be for example a predefined EthernetOAM message. Message CR1 informs client router CR1 about the fact that a restoration path would be available and could be established upon confirmation by the client router CR1.

Since attempts by the client router CR1 to redirect traffic from the failed path P1 over the standby path BY fail due to failure F2 affecting the client network, it decides to accept the offered service upgrade to restoration service and sends back a confirmation message CM1.

As a response to receiving confirmation message CM1, control plane element CPE starts to restore the failed connection over the projected restoration path P2. These restoration actions include control plane signaling with network nodes N5, N6, N7, N8, N9, and EN2 to establish a connection along restoration path P2, as well as local configuration actions via local controller CTR to establish a new cross-connection CC2 between client side interface CI and network side interface NI2, which is linked to network node N5. After the restoration connection along P2 is established and confirmed, network node EN1 finally switches over the failed traffic from client side interface CI to network side interface NI2 and communication between client routers CR1 and CR2 is restored.

Although the above described embodiments make use of a distributed control plane in the provider network, it should be understood that other embodiments, which use a centralized network management system to calculate restoration paths and communicate with the client network, could equally be considered to implement a restoration upgrade service.

It should also be understood that edge nodes EN1, EN2 not necessarily need more than one network side interface, even though they typically would. A restoration path can also be terminated and established from the same network side interface which terminated the failed connection, since the restoration path must only be disjoint from the path of the failed connection at the location of the failure F1.

Although most operations have been explained in the direction of traffic from client router CR1 to client router CR2, it should be understood that traffic flow through provider network PN is typically bidirectional.

A person of skill in the art would readily recognize that steps of the above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. A method of restoring a connection through a provider network comprising:

providing a connection along a path through the provider network between two provider edge nodes for the transport of client traffic between two client network nodes of a client network, wherein said connection is terminated at network side interfaces of said provider edge nodes, wherein the client traffic is received at customer side interfaces of said provider edge nodes, wherein in said provider edge nodes, switched interconnections between the respective customer side interfaces and network side interfaces are configured, and wherein a restoration service for said connection is deactivated;

detecting, before any action is taken regarding a restoration path, a failure along said path affecting said connection and receiving a failure notification at at least one of said network side interfaces of said provider edge nodes;

upon receipt of said failure notification, performing a path search to determine the projected restoration path through said provider network available to restore said failed connection;

if a projected restoration path could be found through said path search, communicating the availability of said restoration path over at least one of said customer side interfaces to said client network; and upon receipt of a confirmation at one of said customer side interfaces from said client network, performing a path restoration to restore said failed connection over said projected restoration path.

2. The method of claim 1, further comprising prior to receiving said confirmation, pre-signaling of said restoration connection along said projected restoration path to temporarily reserve resources for said restoration connection; and finally establishing said restoration connection upon receipt of said confirmation by sending to network nodes along said projected restoration path an activation message to activate the pre-signaled restoration connection.

3. The method of claim 2, further comprising upon receipt of a rejection message from the client network or in the absence of a confirmation message after a predefined amount of time, releasing reserved resources along a projected protection path.

4. The method of claim 1, further comprising if no restoration path with idle resources can be found, considering for said path search also network resources, which are occupied by low priority traffic;

if a restoration path can be found, which uses resources occupied by low priority traffic, communicating to said client network that a restoration path would be availability if the priority level of said client traffic is increased;

upon receipt of the confirmation from said client network, temporarily increasing the priority level of said client traffic and dropping low priority traffic along said projected restoration path to free said occupied resources.

5. A network node of a provider network comprising at least one customer side interface for receiving of client traffic from a client network node; one or more network side interfaces for terminating connections through said provider network; and a switch matrix configurably interconnecting customer side interface and network side interfaces; the network node also comprising at least one processor, the at least one processor being capable of executing the following steps:

to configure said network element to terminate at one of said network side interfaces a connection along a path through the provider network for the transport of said client traffic between said client network node and a far-end client network node, wherein a restoration service for said connection is deactivated;

to receive at said network side interfaces before any action is taken regarding a restoration path a failure notification in case of a failure along said path affecting said connection;

upon receipt of said failure notification, to perform a path search to determine the projected restoration path through said provider network available to restore said failed connection;

if a projected restoration path could be found through said path search, to communicate over said customer side interface the availability of said restoration path to said client network; and upon receipt of a confirmation at said customer side interface from said client network, to perform a path restoration to restore said failed connection over said projected restoration path.

6. The network node of claim 5, wherein the at least one processor is further capable of executing the following steps:

prior to receiving said confirmation, pre-signaling of said restoration connection along said projected restoration path to temporarily reserve resources for said restoration connection; and finally establishing said restoration connection upon receipt of said confirmation by sending to network nodes along said projected restoration path an activation message to activate the pre-signaled restoration connection.

7. The network node of claim 6, wherein the at least one processor is further capable of executing the following step:

upon receipt of a rejection message from the client network or in the absence of a confirmation message after a predefined amount of time, releasing reserved resources along a projected protection path.

8. The network node of claim 5, wherein the at least one processor is further capable of executing the following steps:

if no restoration path with idle resources can be found, considering for said path search also network resources, which are occupied by low priority traffic;

if a restoration path can be found, which uses resources occupied by low priority traffic, communicating to said client network that a restoration path would be availability if the priority level of said client traffic is increased;

upon receipt of the confirmation from said client network, temporarily increasing the priority level of said client traffic and dropping low priority traffic along said projected restoration path to free said occupied resources.

* * * * *